(12) United States Patent
Bonnier et al.

(10) Patent No.: US 11,211,030 B2
(45) Date of Patent: Dec. 28, 2021

(54) ELECTRONIC DEVICE WITH ADAPTIVE DISPLAY

(71) Applicant: Apple Inc., Cupertino, CA (US)

(72) Inventors: Nicolas P. Bonnier, Campbell, CA (US); Teun R. Baar, San Francisco, CA (US); Christina G. Gambacorta, Sunnyvale, CA (US); Jiaying Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/629,495

(22) PCT Filed: Aug. 27, 2018

(86) PCT No.: PCT/US2018/048195
§ 371 (c)(1),
(2) Date: Jan. 8, 2020

(87) PCT Pub. No.: WO2019/046215
PCT Pub. Date: Mar. 7, 2019

(65) Prior Publication Data
US 2021/0134245 A1 May 6, 2021

Related U.S. Application Data

(60) Provisional application No. 62/551,723, filed on Aug. 29, 2017.

(51) Int. Cl.
*G09G 5/10* (2006.01)
*G06F 3/01* (2006.01)
*G06K 9/00* (2006.01)

(52) U.S. Cl.
CPC ............... *G09G 5/10* (2013.01); *G06F 3/013* (2013.01); *G06K 9/0061* (2013.01);
(Continued)

(58) Field of Classification Search
CPC ............ G09G 5/10; G09G 2320/0626; G09G 2354/00; G09G 2360/144; G06F 3/013;
(Continued)

(56) References Cited

U.S. PATENT DOCUMENTS 6,900,778 B1 * 5/2005 Yamamoto ......... G02B 27/0093
345/8
7,136,073 B2 * 11/2006 Newman .............. H04N 1/4072
345/589
(Continued)

FOREIGN PATENT DOCUMENTS

CN 103091843 A 5/2013
CN 104704818 A 6/2015
(Continued)

*Primary Examiner* — Antonio A Caschera
(74) *Attorney, Agent, or Firm* — Treyz Law Group, P.C.; Kendall P. Woodruff (57) ABSTRACT

An electronic device may include a display that displays virtual reality content. Control circuitry may estimate a brightness adaptation state of a user that is wearing the electronic device. The control circuitry may select a tone mapping curve and brightness level for the virtual reality content based on the user's adaptation state. To estimate the user's adaptation state, the control circuitry may gather ambient light information from an ambient light sensor, may gather physiological attributes of the user such as blink rate, pupil size, and eye openness from a camera, and may gather gaze position information from gaze detection circuitry. The control circuitry may optimize the brightness of the display based on the user's current adaptation state, or the control circuitry may shift the brightness of the display away from the user's adaptation level to help guide the adaptation state to the desired level.

19 Claims, 7 Drawing Sheets

(52) U.S. Cl.
CPC . *G09G 2320/0626* (2013.01); *G09G 2354/00* (2013.01); *G09G 2360/144* (2013.01)

(58) Field of Classification Search
CPC .......... G06K 9/0061; H04N 5/57; H04N 5/58; H04N 13/332
See application file for complete search history.

(56) References Cited

U.S. PATENT DOCUMENTS

| | | |
|---|---|---|
| 8,964,298 B2 | 2/2015 | Haddick et al. |
| 9,316,831 B2 | 4/2016 | Takahashi et al. |
| 10,339,896 B2 | 7/2019 | Usui et al. |
| 10,380,973 B2 * | 8/2019 | Aydin .................... G09G 5/005 |
| 2012/0068981 A1 * | 3/2012 | Pantfoerder ......... G09G 3/2003 |
| | | 345/207 |
| 2013/0038790 A1 | 2/2013 | Seetzen et al. |
| 2015/0168723 A1 | 6/2015 | Eto et al. |
| 2015/0235427 A1 | 8/2015 | Nobori et al. |
| 2016/0080720 A1 | 3/2016 | Fullam |
| 2016/0178904 A1 | 6/2016 | Deleeuw et al. |

FOREIGN PATENT DOCUMENTS

| | | |
|---|---|---|
| CN | 105683812 A | 6/2016 |
| CN | 106157930 A | 11/2016 |
| CN | 106683601 A | 5/2017 |
| JP | 2000298246 A | 10/2000 |
| WO | 2012133379 A1 | 10/2012 |
| WO | 2013049248 A2 | 4/2013 |
| WO | 2016046885 A1 | 3/2016 |

\* cited by examiner

ELECTRONIC DEVICE WITH ADAPTIVE DISPLAY

This application claims priority to the U.S patent application Ser. No. 62/551,723, filed on Aug. 29, 2017, which is hereby incorporated by reference herein in its entirety.

BACKGROUND

This relates generally to adaptive displays and, more particularly, to adaptive displays for head-mounted devices.

Head-mounted devices such as virtual reality glasses and augmented reality glasses use displays to generate images to a user.

If care is not taken, a head-mounted device may be cumbersome and tiring to wear. The images on the display may appear too dark and washed out when the user first puts the head-mounted device on his or her head. The user may experience dazzle or discomfort when transitioning out of a virtual reality viewing experience. The dynamic range of a head-mounted display may be perceived as insufficient depending on the adaptation state of the user's eyes.

SUMMARY

An electronic device configured to be worn by a user may include a display that displays virtual reality content. Control circuitry in the electronic device may estimate a brightness adaptation state of the user that is wearing the electronic device. The control circuitry may adjust a brightness of the display based on the user's adaptation state. This may include, for example, optimizing a brightness range of the display for the current adaptation state of the user, adjusting a brightness range of the display to have a desired effect on the user's adaptation state (e.g., to help "guide" the user's current adaptation state to a different adaptation state), adjusting a brightness range at certain periods of time to boost the perceived dynamic range of the display, adjusting brightness in some regions of an image differently than in other regions of an image to account for the user's adaptation state, and/or taking other actions based on the estimated adaptation state of the user.

The control circuitry may gather ambient light information from an ambient light sensor, may gather physiological attributes of a user such as blink rate, pupil size, and eye openness from a camera, and may gather gaze position information from gaze detection circuitry. Gaze position may be combined with image data (e.g., frames of display data that are being displayed on the display) to determine the average pixel luminance at a location on the display that aligns with the user's gaze position. Based on this information, the control circuitry may determine a brightness adaptation state of the user.

When a user first turns on the display of the electronic device, the user may be bright-adapted (due to the ambient light in the room where the electronic device is located). The control circuitry may account for this adaptation state by starting at a first brightness level and gradually reducing the brightness of the display to a second brightness level. By the time the second brightness level is reached, the user may be dark-adapted.

When a video ends or a user exits a video playing mode and enters a home screen on the display, the control circuitry may increase the brightness of the display gradually to increase the user's adaptation level. This helps avoid dazzle or discomfort when the user takes off the electronic device and is greeted with a brightly lit room.

The control circuitry may also use adaptation state information to increase the perceived dynamic range of the display and to selectively adjust the brightness of portions of an image based on where the user is looking.

DETAILED DESCRIPTION

Head-mounted devices such as head-mounted displays may be used for virtual reality and augmented reality systems. For example, a pair of virtual reality glasses that is worn on the head of a user may be used to provide a user with virtual reality content.

Figure 1:
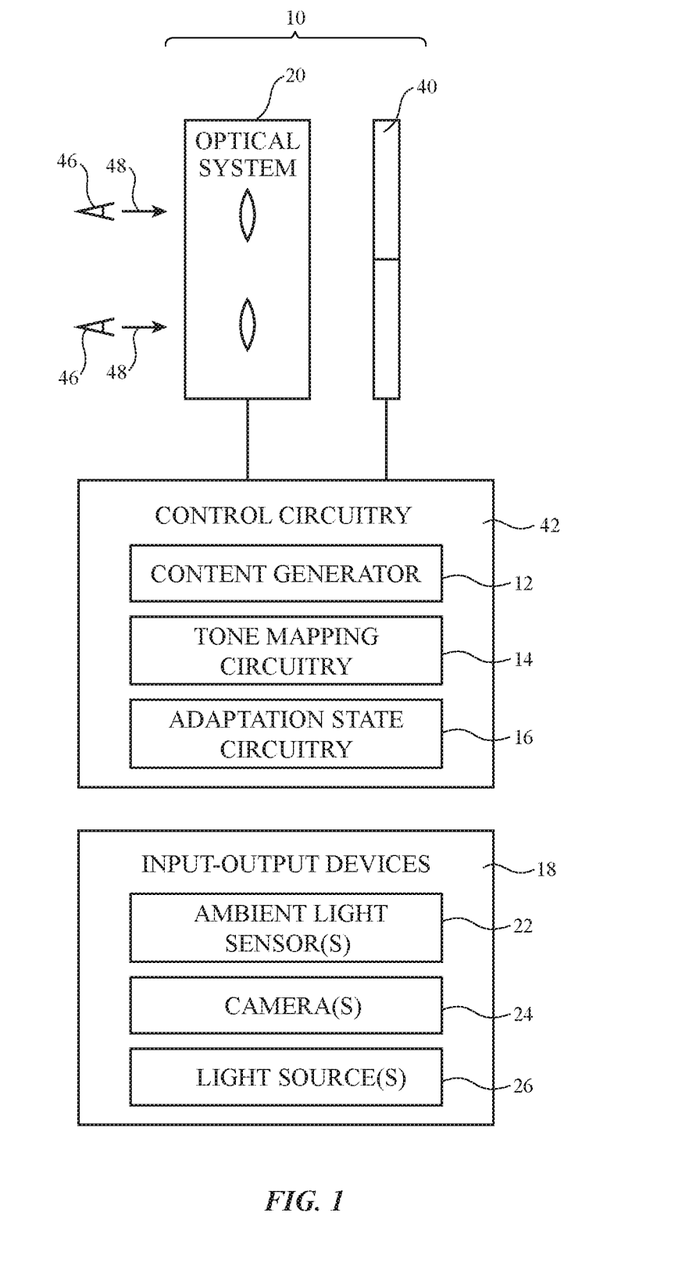
FIG. 1 is a diagram of an illustrative head-mounted device in accordance with an embodiment.

An illustrative system in which a head-mounted device such as a pair of virtual reality glasses is used in providing a user with virtual reality content is shown in FIG. 1. As shown in FIG. 1, head-mounted device 10 may include a display system such as display system 40 that creates images and may have an optical system such as optical system 20 through which a user (see, e.g., user's eyes 46) may view the images produced by display system 40 in direction 48.

Display system 40 may be based on a liquid crystal display, an organic light-emitting diode display, a display having an array of crystalline semiconductor light-emitting diode dies, a liquid-crystal-on-silicon display, a microelectromechanical systems (MEMs) display, and/or displays based on other display technologies. Separate left and right displays may be included in system 40 for the user's left and right eyes or a single display may span both eyes.

Visual content (e.g., image data for still and/or moving images) may be provided to display system 40 using control circuitry 42 that is mounted in head-mounted device 10 and/or control circuitry that is mounted outside of head-mounted device 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display system 40 to display visual content such as virtual reality content (e.g., computer-generated content associated with a virtual world), pre-recorded video for a movie or other media, or other images.

During operation, a content generator in device 10 such as content generator 12 (e.g., operating system functions and/or applications running on control circuitry 42) may generate content for display system 40 (e.g., virtual reality content, high dynamic range content, standard dynamic range content, etc.). A luminance value mapping circuitry such as tone mapping circuitry 14 may be used to provide content generators with tone mapping parameters (sometimes referred to as luminance value mapping parameters) indicating how the content generators should map content luminance values to display luminance values and/or may be used to directly perform content-luminance-to-display-luminance mapping operations on content luminance values from the content generators. For example, tone mapping circuitry 14 may produce tone mapping parameters that are based on the current adaptation level of the user's visual system to use in producing display luminance values for use in displaying images with display system 40. Tone mapping circuitry 14 may be implemented using code running on control circuitry 42 and/or other control circuitry and/or may use hardwired features of the control circuitry in device 10. The tone mapping parameters may be expressed in any suitable format. For example, tone mapping parameters such as adaptation level, black level, reference white level, and/or specular white level may be expressed in cd/m².

The human visual system is capable of perceiving a large range of luminance levels. However, the human eye cannot see all of these brightness levels at the same time. Rather, the eye continuously adjusts its sensitivity to the viewing environment in order to perceive different ranges of luminance levels within the eye's larger overall dynamic range. The current sensitivity level of the human visual system is sometimes referred to as its brightness adaptation level. The subjective brightness perceived by a user is usually dependent on the user's brightness adaptation level. When the human visual system is bright-adapted (i.e., adapted to bright light), the eye is less sensitive. In contrast, when the human visual system is dark-adapted (i.e., adapted to low light), the eye is more sensitive.

If care is not taken, a user that is adapted to bright ambient light before using a head-mounted display may initially perceive the images on the display as dim and washed out until the user's eyes adapt to the darkness of the head-mounted display. Similarly, a user that is adapted to the darkness of a head-mounted display may experience dazzle and discomfort when the user removes the head-mounted display and is faced with bright ambient light.

To enhance the user's experience of head-mounted device 10, control circuitry 42 may include adaptation state circuitry 16 for estimating an adaptation state of the user. Adaptation state may be represented by a luminance value or range of luminance values. Adaptation state circuitry 16 may provide adaptation state information to tone mapping circuitry 14 so that tone mapping circuitry 14 can adapt display data according to the adaptation state of the user. This may include, for example, matching (e.g., optimizing) a brightness range of display 40 with the current adaptation state of the user, adjusting a brightness range of display 40 to have a desired effect on the user's adaptation state (e.g., to help "guide" the user's current adaptation state to a different adaptation state), adjusting a brightness range at certain periods of time to boost the perceived brightness or darkness at another time, adjusting brightness for some portions of an image to boost the perceived brightness or darkness of other portions of an image, selecting appropriate tone mapping parameters based on the adaptation state of the user, and/or taking other actions based on the estimated adaptation state of the user. Tone mapping circuitry 14 may be configured to adapt display data for left and right displays. The display data adjustment may be the same for both displays or the display data adjustment may be different for the left and right displays. For example, tone mapping circuitry 14 may use different tone mapping curves for the left and right displays to account for different tone mapping needs for the user's left and right eyes, if desired.

Input-output devices 18 may be coupled to control circuitry 42. Input-output devices 18 may be mounted in head-mounted device 10 and/or may be mounted outside of head-mounted device 10 (e.g., in an associated portable electronic device, laptop computer, or other computing equipment). Input-output devices 18 may be used to gather user input from a user, may be used to make measurements on the environment surrounding device 10, may be used to provide output to a user, and/or may be used to supply output to external electronic equipment. Input-output devices 18 may include buttons, joysticks, keypads, keyboard keys, touch sensors, track pads, displays, touch screen displays, microphones, speakers, light-emitting diodes for providing a user with visual output, and sensors (e.g., force sensors, temperature sensors, magnetic sensor, accelerometers, gyroscopes, and/or other sensors for measuring orientation, position, and/or movement of glasses 10, proximity sensors, capacitive touch sensors, strain gauges, gas sensors, pressure sensors, ambient light sensors, and/or other sensors).

Input-output circuitry 18 may include a color ambient light sensor or other ambient light sensor 22 for gathering ambient light measurements (e.g., ambient light levels such as ambient light luminance measurements and/or ambient light color measurements such as color temperature measurements and/or color coordinate measurements). Input-output circuitry 18 may also include cameras 24 (digital image sensors) for capturing images of the user's surroundings, for performing gaze detection operations by viewing eyes 46, and/or other cameras. Input-output devices 18 may include a sensing system that measures characteristics of the user's eyes 46. For example, light source 26 and camera 24 may be used in supplying light to eye 46 and measuring reflected light to measure the optical properties of eye 46. Light source 26 may produce light at any suitable wavelength (e.g., near infrared light wavelengths, longer infrared wavelengths, visible wavelengths, etc.). Camera 24 and/or light source 26 may be used in determining pupil size, blink rate, facial expression, eye openness (e.g., whether the user is squinting), etc. Camera 24 may also be used by control circuitry 42 to gather images of the pupils and other portions of the eyes of the viewer. The locations of the viewer's pupils and the locations of the viewer's pupils relative to the rest of the viewer's eyes may be used to determine the locations of the centers of the viewer's eyes (i.e., the centers of the user's pupils) and the direction of view (gaze direction) of the viewer's eyes.

Figure 2:
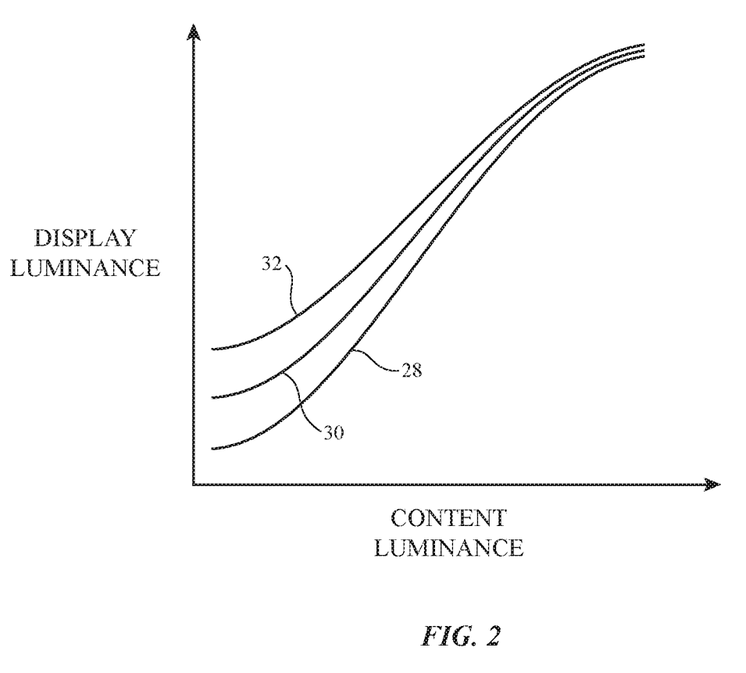
FIG. 2 is a graph showing how content luminance may be mapped to display luminance based on a variety of different brightness adaptation states in accordance with an embodiment.

FIG. 2 is a graph showing how content luminance values can be mapped to display luminance values by device 10 for three different illustrative adaptation states. The content luminance and display luminance axes of the graph of FIG. 2 have logarithmic scales. In the example of FIG. 2, curve 28 is optimized for a dark adaptation state (e.g., when the user is adapted to a dark environment), curve 30 is optimized for a moderate adaptation state (e.g., when a user is adapted to a lit office or a dim outdoors environment), and curve 32 is optimized for a bright adaptation state (e.g., when a user is adapted to a bright outdoors environment). There may be greater or fewer than three different optimized curves for mapping content luminance values to display luminance values based on the adaptation state of the user. The use of three curves each optimized for one of three adaptation states is merely illustrative.

Tone mapping circuitry 14 may switch from one tone mapping curve to another tone mapping curve based on various factors. In some scenarios, tone mapping circuitry 14 may select the tone mapping curve that is optimized for the user's current adaptation state. For example, when a user first places device 10 on his or her head, the user's eyes may gradually adapt from the bright room environment to the dark viewing conditions of device 10. Tone mapping circuitry 14 may follow the user's adaptation in this scenario, using bright adaptation curve 32 at first and gradually moving to dark adaptation curve 28.

In other scenarios, tone mapping circuitry 14 may be used to drive or guide a user's adaptation from its current state to a different state. For example, when a video that the user is watching ends, when the user enters a home screen, or when a user otherwise indicates that he or she is transitioning out of the virtual reality experience, tone mapping curve 28 may adjust display data to gradually shift the user's adaptation state from dark-adapted to bright-adapted to avoid any dazzle or discomfort when the user removes device 10. In this type of scenario, tone mapping circuitry 14 may use dark adaptation curve 28 at first and gradually move to bright adaptation curve 32, thereby causing the user's eyes to slowly become bright-adapted.

Figure 3:
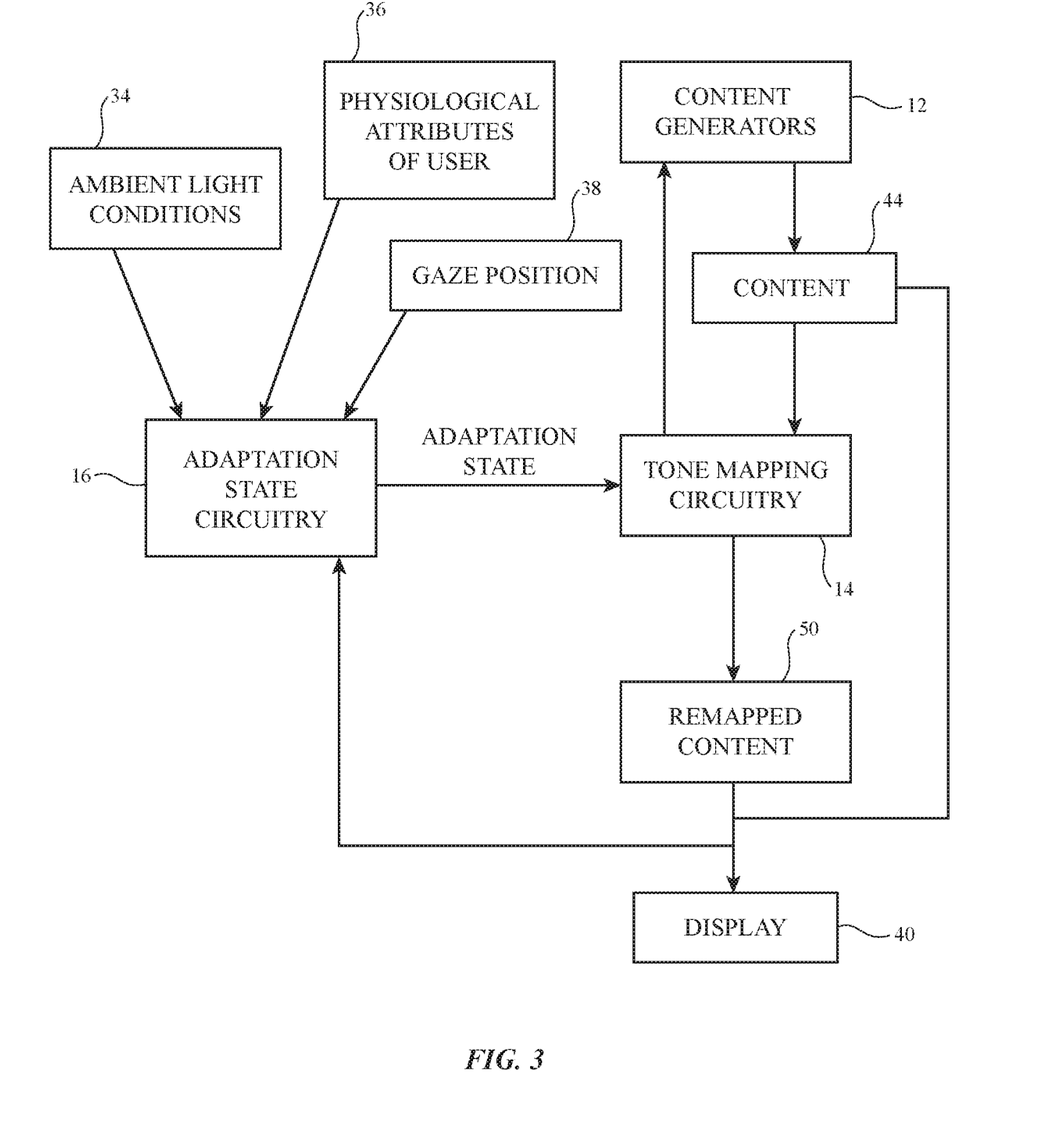
FIG. 3 is a diagram showing how a tone mapping circuitry may use information about a user's adaptation state to implement content-luminance-to-display-luminance mappings in accordance with an embodiment.

FIG. 3 is a diagram showing how adaptation state circuitry 16 may receive input such as ambient light conditions 34, physiological attributes 36 of a user, gaze position 38, and display content (e.g., display content 44 and/or remapped content 50). Adaptation state circuitry 16 may estimate a user's adaptation state based on one or more of these inputs and my provide the estimated adaptation state to tone mapping circuitry 14.

Ambient conditions 34 may include a current ambient light level measured with ambient light sensor 22. By measuring a brightness of the ambient environment outside of head-mounted device 10, adaptation state circuitry 16 may be able to estimate the adaptation state of a user when the user puts device 10 on his or her head and turns display 40 on. Tone mapping circuitry 14 can then determine tone mapping parameters based on the user's current adaptation state. For example, if ambient light sensor conditions 34 indicate bright ambient light, adaptation state circuitry may conclude that the user is bright-adapted. Tone mapping circuitry 14 may begin with bright-adapted curve 32 so that the images appear sufficiently bright to the user. Tone mapping circuitry 14 may gradually shift to tone mapping parameters that are optimized for a dark adaptation state as the user adapts to the dark viewing conditions of device 10.

Physiological attributes 36 may include a pupil size, blink rate, facial expression, eye openness, and/or other information that may indicate the user's adaptation state. For example, as a user's eyes adapt to dark ambient conditions, the pupils may become larger, the blink rate may decrease, a distance between eyes and cheeks may decrease as the face relaxes, and eyes may squint less. These physiological attributes may be measured (e.g., using camera 24 and/or light emitter 26) and used by adaptation state circuitry 16 to estimate an adaptation state of the user. In addition to being indicative of a user's adaptation state, physiological attributes 36 may also be indicative of the user's fatigue level. Users may experience fatigue after viewing images on a head-mounted display for extended periods of time. If desired, tone mapping circuitry 14 may use physiological attributes 36 to determine a fatigue level of the user and adjust tone mapping parameters accordingly. For example, tone mapping circuitry 14 may darken the display when a user is showing signs of a fatigue to make the viewing experience more comfortable.

Gaze position 38 may also be used to estimate an adaptation state of the viewer. If the viewer's gaze is directed towards a bright portion of the image, the user may be slightly bright-adapted, whereas a viewer that is gazing towards a dark portion of the image may be more dark-adapted. Gaze position 38 may be measured using camera 24 to capture images of the viewer's pupils and other portions of the viewer's eyes. Gaze position 38 may be used in combination with the pixel luminance at the gaze location to estimate the user's current adaptation state. This calculation may include, for example, a moving average over the pixel luminance levels around the user's gaze position to estimate user's adaptation state. Pixel luminance at the gaze position 38 may be determined by analyzing frames of image data that are being displayed on display 40 (e.g., by analyzing content 44 and/or remapped content 50).

During operation, content generators 12 may produce content to be displayed on display 40. Content generators 12 may, for example, generate virtual reality content. This may include rendering game images in a video game, retrieving stored movie data and providing corresponding video frames to be displayed on display 40, producing still image frames associated with an operating system function or application program, and/or producing other content for displaying on display 40.

Adaptation state circuitry 16 may use information on ambient conditions 34, physiological attributes 36, gaze position 38, and/or content 44 and 50 to estimate a user's adaptation state. The adaptation state may be provided to tone mapping circuitry 14. Tone mapping circuitry 14 may use the adaptation state to determine how original content values should be mapped to display content values (e.g., to determine how to map content luminance values to display luminance values in accordance with mapping curves of the type described in connection with FIG. 2). This is sometimes referred to as adjusting the brightness level of the display. To ensure that content is displayed appropriately on display 40, tone mapping circuitry 14 can provide content generators 12 with tone mapping parameters to use in performing luminance mapping operations and/or tone mapping circuitry 14 can implement luminance mapping for content generators 12.

In some configurations, content generators 12 may be capable of adjusting content luminance values internally. In these situations, tone mapping circuitry 14 can supply content generators 12 with tone mapping parameters. The tone mapping parameters inform content generators 12 of an appropriate mapping curve to use in supplying content 44 to display 40.

In other configurations, content generators 12 may not be capable of adjusting content luminance values internally or it may otherwise be desirable to implement tone mapping separately from the tone mapping functions of content generators 12. In these circumstances, content 44 from content generator 12 may be provided to tone mapping circuitry 14. Tone mapping circuitry 14 may then apply a desired content-luminance-to-display-luminance mapping (e.g., a mapping defined done mapping parameters associated with one of the curves shown in FIG. 2) to ensure that the luminance of content 44 is adjusted appropriately (e.g., so that content 44 is remapped in accordance with a desired content-luminance-to-display luminance mapping to produce corresponding remapped content 50 for displaying on display 40).

Figure 4:
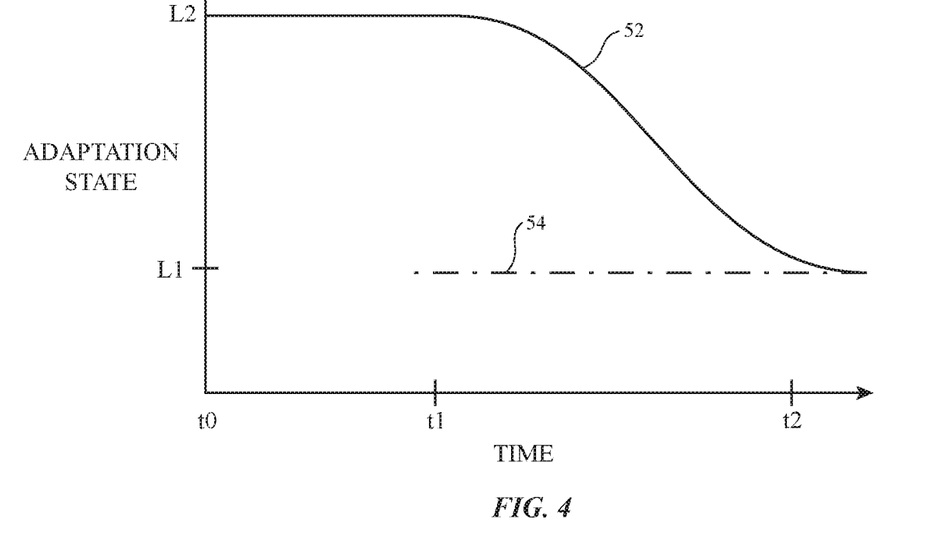
FIG. 4 is a graph showing how a user's initial brightness adaptation state may be out of sync with the adaptation state that a display is optimized for in accordance with an embodiment.

In the example of FIG. 4, curve 52 represents the adaptation state of a user. Curve 54 represents the adaptation state that the display is optimized for. Before the user places the head-mounted display on his or her head at time t1, the user's adaptation state is relatively bright at level L2 because the user is adapted to the brightly lit room. At time t1, the display begins displaying images that are optimized for a user who is dark-adapted at level L1. At time t2, the user's eyes adapt to the dark viewing conditions and the user's adaptation state shifts from bright-adapted (L2) to dark-adapted (L1). From time t1 to time t2, however, there is a mismatch between the user's adaptation state and the adaptation state that the display content is optimized for. This can lead to the content appearing dim and washed out initially, until the user's eyes adapt to the dark environment.

Figure 5:
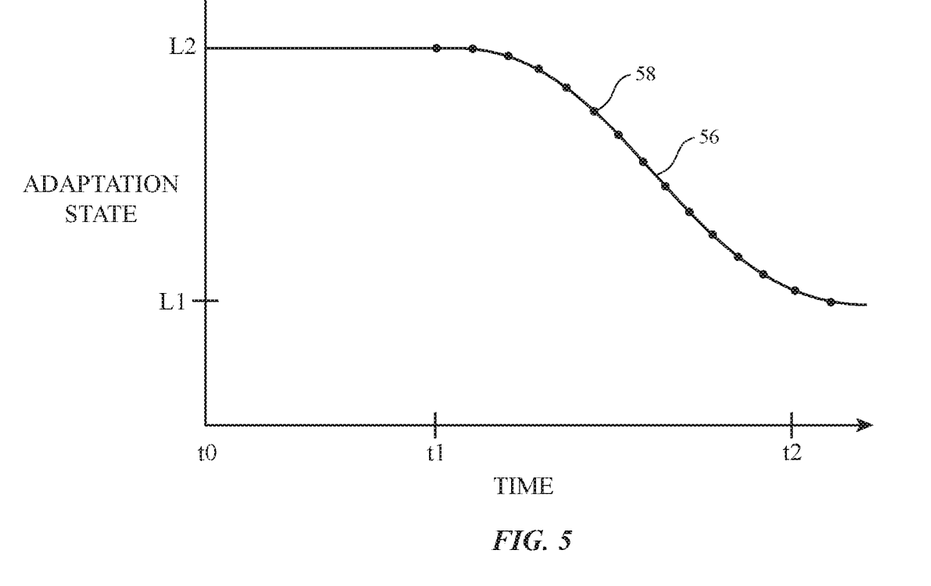
FIG. 5 is a graph showing how a display may be optimized for an adaptation state that matches the adaptation state of the user in accordance with an embodiment.

In the example of FIG. 5, curve 56 represents the adaptation state of the user and curve 58 represents the adaptation state that the display (e.g., display 40) is optimized for. As in the example of FIG. 4, the user's adaptation state is relatively bright at level L2 because the user is adapted to the brightly lit room before using device 10. When the user places device 10 on his or her head and display 40 begins displaying content at time t1, tone mapping circuitry 14 may adjust the brightness of display content such that it is optimized for the user's bright adaptation state L2. In some arrangements, the adaptation state that display 40 is optimized for (i.e., curve 58) may be based on an estimated adaptation state that is calculated by adaptation state circuitry 16. Adaptation state circuitry 16 may calculate an adaptation state just prior to display 40 being turned on, in response to display 40 being turned on, or in response to any other suitable action (e.g., in response to device 10 being placed on a user's head). In other arrangements, tone mapping circuitry 14 may use a predetermined initial brightness setting that automatically shifts over time from bright-adapted to dark-adapted. This type of predetermined optimization may, for example, be based on user studies or other information (e.g., curve 58 may be based on a typical adaptation shift for users that transition from bright indoor lighting to dim head-mounted display lighting).

The example of FIG. 5 in which curve 58 matches curve 56 is merely illustrative. If desired, curve 58 may be slightly different from curve 56 (e.g., curve 58 may be slightly above or below curve 56). The difference may not be noticeable to the viewer but may help guide the user's adaptation state to the desired level.

In some arrangements, it may be desirable to drive or guide a user's adaptation state from one level to another level. For example, when a user is transitioning out of a virtual reality experience (e.g. when a movie or video ends, when a user enters a home screen or otherwise indicates the viewing experience is nearing an end, etc.), it may be desirable to direct the user's adaptation level from dark to bright so that the user does not experience dazzle or discomfort upon removing device 10 from his or her eyes.

Figure 6:
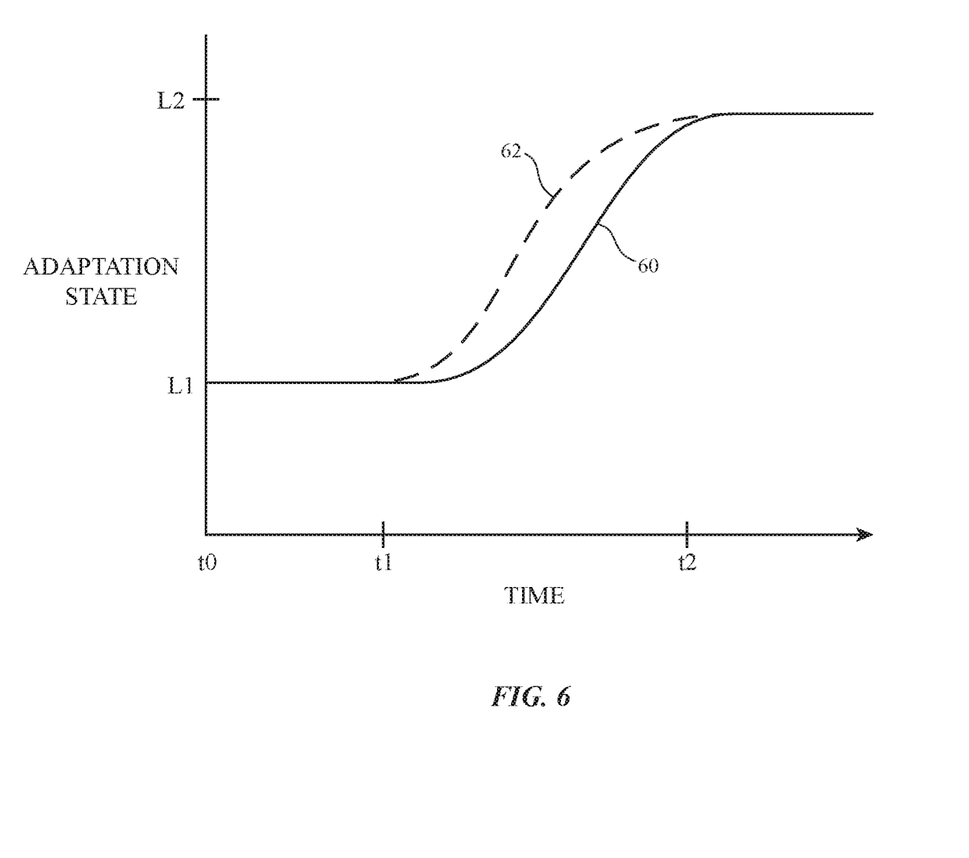
FIG. 6 is a graph showing how a display may be temporarily be optimized for an adaptation state that is different from that of the user's to gradually increase the user's adaptation level before the user transitions out of a virtual reality experience in accordance with an embodiment.

This type of scenario is illustrated in FIG. 6. In this example, curve 60 represents the adaptation state of the user and curve 62 represents the adaptation state that display 40 is optimized for. From time t0 to time t1, the user is viewing content on display 40 and is dark-adapted at adaptation state L1. Content on display 40 is optimized for adaptation state L1. At time t1, information from input-output devices 18 and/or control circuitry 42 may indicate that the viewing experience is over or coming to an end. This may include, for example, user input that causes display 40 to pause or stop video, user input that results in a home screen being displayed on display 40, control circuitry 42 indicating a movie or other video has ended, or other information indicating that the viewing experience is over or nearly over. This information may cause tone mapping circuitry 14 to display content that is optimized for a brighter adaptation level than the user's actual current adaptation level. This may include, for example, gradually increasing the overall brightness of display 40 from time t1 to time t2. The increased brightness of display 40 increases the adaptation level of the user until the user reaches adaptation level L2.

In some arrangements, the gradual increase in brightness of display 40 (e.g., curve 62) may be based on gathered sensor data. For example, ambient light sensor 22 may be used to measure the ambient brightness of the environment outside of device 10. This information may be used by tone mapping circuitry 14 to determine the appropriate brightness level of display 40. In other scenarios, the gradual increase in brightness of display 40 may be predetermined (e.g., may be a fixed transition from dark to bright over a predetermined period of time). This type of predetermined brightness shift may be based on user studies or other information (e.g., curve 62 may be based on a typical indoor lighting conditions).

Figure 7:
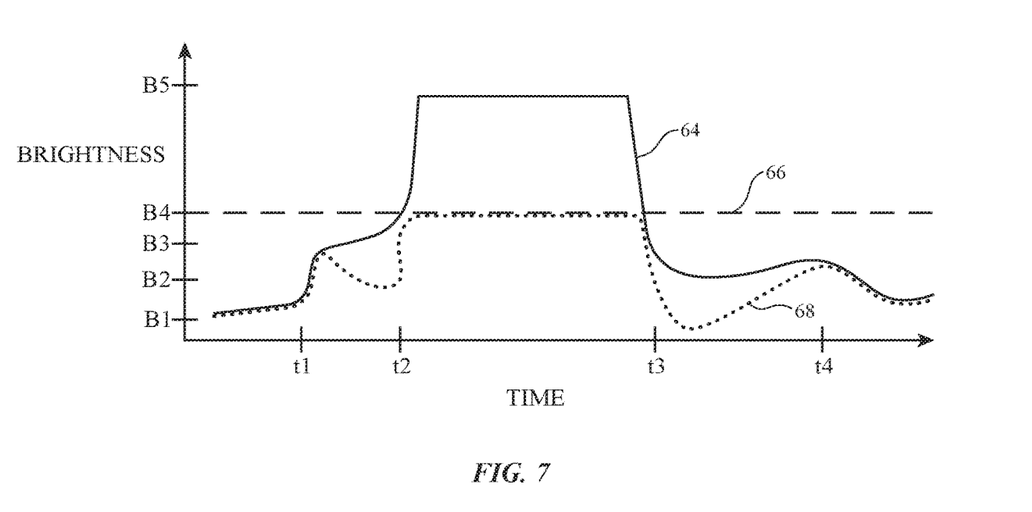
FIG. 7 is a graph showing how the brightness of a display may be adjusted before and after a large brightness increase to enhance the perceived dynamic range of the display in accordance with an embodiment.

FIG. 7 illustrates another method in which user experience may be enhanced by tracking the user's brightness adaptation state. The graph of FIG. 7 illustrates a scenario in which tone mapping circuitry may adjust display content to shift the user's adaptation state so that bright colors are perceived brighter and dark colors are perceived darker. This type of adaptation state shifting may be beneficial in situations when the maximum brightness of a display is less than an intended brightness level.

In the example of FIG. 7, curve 64 represents the intended brightness (e.g., the brightness associated with an input image from a content generator), line 66 represents the maximum brightness of display 40, and curve 68 represents the output brightness (e.g., the brightness of an image displayed on display 40).

As shown in FIG. 7, the intended brightness of content over time may include a scene change in which the brightness jumps to brightness level B5 from time t2 to time t3. In some arrangements, brightness B5 may be greater than the peak brightness that display 40 is capable of. In other arrangements, it may not be desirable to produce brightness B5 (e.g., due to power consumption or other considerations). In either case, display 40 may produce brightness level B4 instead of brightness level B5. If display 40 were to follow the intended brightness (curve 64) from time t1 to time t2, the brightness of display 40 from time t2 to time t3 would be perceived as insufficiently bright.

To avoid this type of issue and to increase the perceived dynamic range of display 40, display 40 may slowly reduce the brightness before and/or after a large brightness increase such as the one shown in FIG. 7. The brightness of display 40 (curve 68) may slowly decrease from level B3 to level B2 from time t1 to time t2. As the brightness of display 40 decreases, the user's adaptation state will become more dark-adapted, such that the sudden increase in brightness of display 40 from B2 to B4 at time t2 will appear more pronounced to the user. In other words, the brightness shift from B2 to B4 will be perceived similarly to the brightness shift from B3 to B5 because the sensitivity of the user's eyes will increase as the user becomes more dark-adapted. Similarly, at time t3, the brightness of display 40 is momentarily decreased from level B4 to level B1. The user may perceive the brightness shift from B4 to B1 similarly to the intended brightness shift from B5 to B3. The momentary brightness decrease to level B1 may also serve to reset the user's brightness adaptation to be more dark-adapted. In arrangements where display 40 is displaying high dynamic range content, this gradual decrease in brightness at time t2 and time t3 may also provide more headroom (e.g., a greater range between the specular white level and the reference white level of the content) for the high dynamic range content.

If desired, adaptation state circuitry 16 may track the user's adaptation state from time t1 to time t2 to ensure that the slow brightness change is not noticeable to the user.

Figure 8:
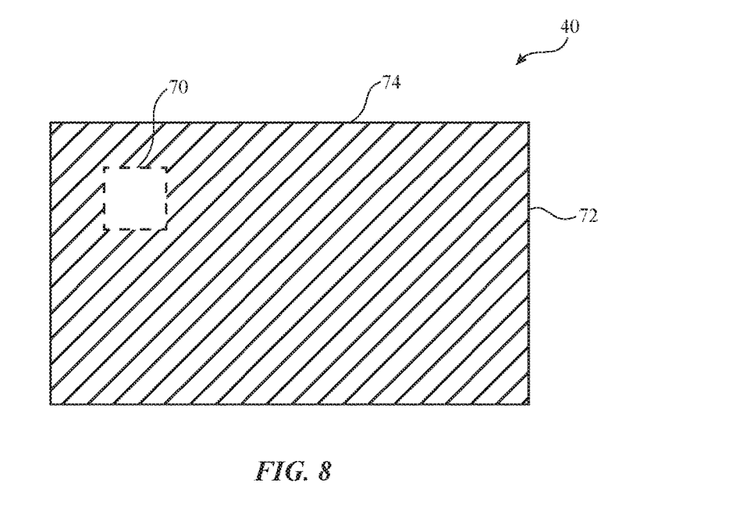
FIG. 8 is a diagram showing how a portion of an image that aligns with a user's gaze position may be optimized for the user's current adaptation state in accordance with an embodiment.

Tone mapping circuitry 14 may also take into account the user's adaptation state as it determines how to adjust content in one portion of an image relative to content in another portion of an image. FIG. 8 shows an illustrative image 74 being displayed on display 40. In image 74, region 70 may be mapped using different tone mapping parameters than surrounding region 72. Region 70 may be an area of image 74 that the user's eyes are focused on. Gaze tracking circuitry (e.g., camera 24) may be used to track a user's gaze, determine a direction of view, and determine which portion of image 74 is at the center of the user's direction of view. Tone mapping circuitry 14 may use this information, along with an estimate of the user's adaptation state, to optimize region 70 for the user's viewing and adaptation state. This may include using different tone mapping parameters for region 70 than for region 72 (e.g., by making region 70 brighter than region 72, by making region 70 darker than region 72, or by otherwise adjusting content for region 70 differently than for region 72).

Figure 9:
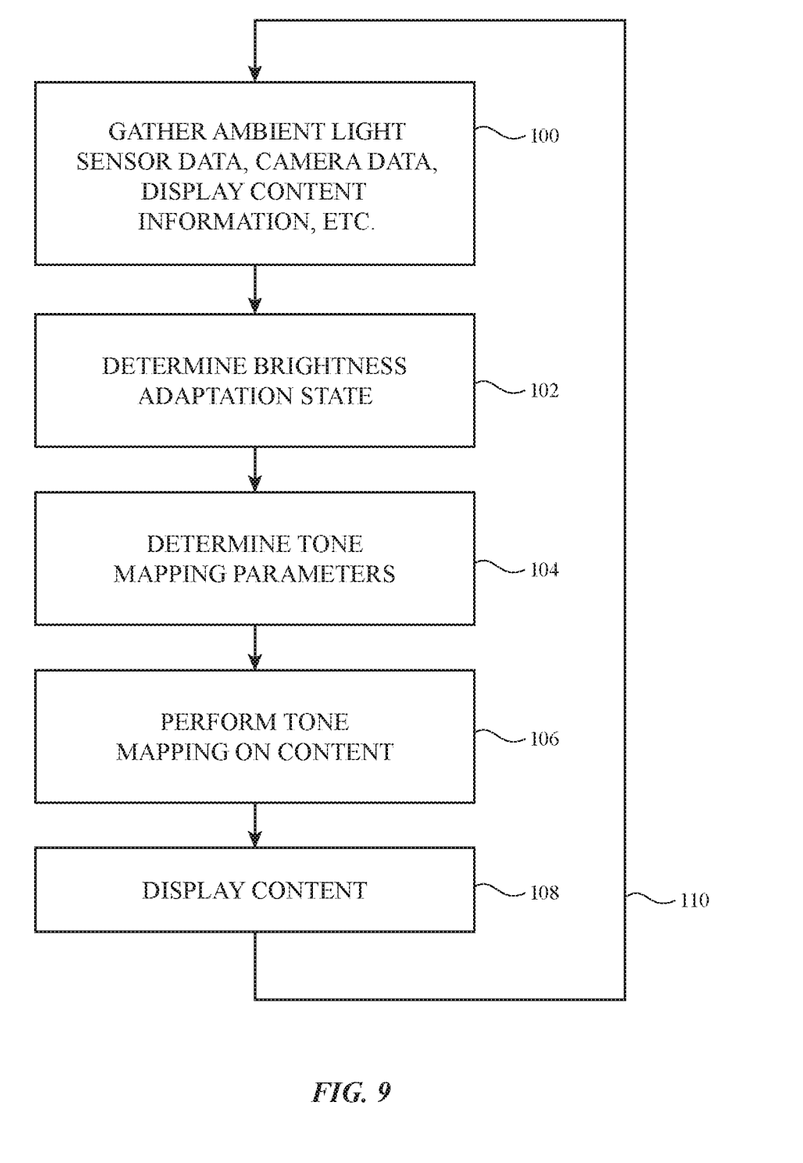
FIG. 9 is a flow chart of illustrative operations involved in using a head-mounted device with a display in accordance with an embodiment.

FIG. 9 is a flow chart of illustrative operations involved in operating device 10.

During the operations of block 100, control circuitry 42 (e.g., adaptation state circuitry 16, tone mapping circuitry 14, and/or other code running on device 10) may use input-output circuitry 18 to gather information on ambient conditions 36 such as ambient light sensor readings (e.g., ambient light level information from ambient light sensor 22), to gather information on physiological attributes 36 of the user wearing device 10 (e.g., from camera(s) 24, light source 26, and/or other sensors), and to gather gaze position information 38 (e.g., from gaze detection circuitry such as camera(s) 24). Control circuitry 42 may also gather display data (e.g., frames of display data that are being displayed on display 40, including content 44 and/or remapped content 50) to determine pixel luminance at the pixels the user is focused on (e.g., to calculate a moving average over the pixel luminance levels around the user's gaze position).

During the operations of block 102, adaptation state circuitry 16 may estimate the user's adaptation state based on the information gathered during block 100. This may include determining a luminance value that estimates the user's adaptation state, determining a range of luminance values that estimate the user's adaptation state, or selecting an adaptation state that most closely matches the user's adaptation state from a group of stored adaptation states (e.g., dark-adapted, moderate-adapted, bright-adapted, etc.).

During the operations of block 104, tone mapping circuitry 14 may select a tone mapping curve (e.g., a content-luminance-to-display-luminance mapping such as one of the illustrative mappings of FIG. 2) to be applied to the content of content generators 12 based on the information gathered during block 100 and the adaptation state determined during block 102. Tone mapping parameters (e.g., a white level, black level, and/or other tone mapping parameters) corresponding to the selected tone mapping curve may also be generated.

During the operations of block 106, the selected tone mapping parameters may be applied to the content for display 40. This may include using tone mapping circuitry 14 to remap content to appropriate luminance values based on the selected tone mapping curve, and/or may include supplying tone mapping parameters to content generators 12 for use by content generators 12 (e.g., so that content generators 12 supply content to display 40 that is compliant with the selected tone mapping curve).

As indicated by block 108, content with luminance values adjusted by circuitry 14 and/or content generators 12 in accordance with the selected tone mapping parameters may be displayed on display 40. As indicated by line 110, the operations of FIG. 9 may be performed continually during the operation of display 40 and device 10.

In accordance with an embodiment, an electronic device configured to be worn by a user is provided that includes an ambient light sensor that measures ambient light outside of the electronic device, a camera that is used to measure physiological attributes, a display that generates virtual reality content, and control circuitry configured to receive an ambient light reading from the ambient light sensor, adjust a brightness of the virtual reality content on the display based on the ambient light reading and the physiological attributes.

In accordance with another embodiment, the electronic device includes gaze detection circuitry that determines a gaze position, the control circuitry is configured to adjust the brightness of the virtual reality content based on the gaze position.

In accordance with another embodiment, the control circuitry is configured to determine an average pixel brightness at a location on the display that aligns with the gaze position.

In accordance with another embodiment, the control circuitry is configured to adjust the brightness of the virtual reality content based on the average pixel brightness at the location.

In accordance with another embodiment, the control circuitry is configured to adjust the brightness of the virtual reality content from a first brightness level to a second brightness level, the first brightness level is less than the second brightness level, and the first brightness level is used when the display displays a video and the second brightness level is used when the display displays a menu screen.

In accordance with another embodiment, the physiological attributes includes at least one of blink rate, pupil size, and eye openness.

In accordance with another embodiment, the control circuitry is configured to estimate a brightness adaptation state of the user based on the ambient light reading and to adjust the brightness of the virtual reality content based on the estimated brightness adaptation state.

In accordance with another embodiment, the control circuitry is configured to select a tone mapping curve for the virtual reality content based on the ambient light reading and the physiological attributes.

In accordance with an embodiment, an electronic device configured to be worn by a user is provided that includes an ambient light sensor that measures ambient light outside of the electronic device, an input-output component that gathers information about the user, a display that generates virtual reality content and control circuitry configured to estimate a brightness adaptation state of the user based on the ambient light and the information and adjust a brightness of the virtual reality content on the display based on the brightness adaptation state.

In accordance with another embodiment, the control circuitry is configured to adjust the brightness by optimizing the brightness for the brightness adaptation state.

In accordance with another embodiment, the control circuitry is configured to adjust the brightness of the display from a first brightness level to a second brightness level, the first brightness level is greater than the second brightness level, and the first brightness level is used when the display is turned on and the second brightness level is used a period of time after the display is turned on.

In accordance with another embodiment, the control circuitry is configured to adjust the brightness of the display from a first brightness level to a second brightness level, the first brightness level is less than the second brightness level, and the first brightness level is used when the display displays a video and the second brightness level is used when the display displays a menu screen.

In accordance with another embodiment, the input-output component includes a camera that is used to measure a gaze position.

In accordance with another embodiment, the control circuitry is configured to determine an average pixel brightness at a location on the display that aligns with the gaze position.

In accordance with another embodiment, the control circuitry is configured to estimate the brightness adaptation state of the user based on the average pixel brightness at the location.

In accordance with another embodiment, the input-output component includes a camera that measures at least one of blink rate, pupil size, and eye openness.

In accordance with an embodiment, a method for operating an electronic device having a display that displays virtual reality content is provided that includes an ambient light sensor, measuring ambient light outside of the electronic device, with a camera, gathering information about a user wearing the electronic device, with control circuitry, determining a brightness adaptation state of the user, and adjusting a brightness of virtual reality content based on the brightness adaptation state of the user.

In accordance with another embodiment, adjusting the brightness of the virtual reality content includes optimizing the brightness of the virtual reality content for the brightness adaptation state of the user.

In accordance with another embodiment, adjusting the brightness of the virtual reality content includes decreasing the brightness of the virtual reality content to shift the brightness adaptation state of the user from a first brightness adaptation level to a second brightness adaptation level.

In accordance with another embodiment, gathering information about the user includes tracking at least one of: gaze position, blink rate, pupil size, and eye openness.

The foregoing is merely illustrative and various modifications can be made to the described embodiments. The foregoing embodiments may be implemented individually or in any combination.

What is claimed is:

1. An electronic device configured to be worn, comprising:
    an ambient light sensor that measures ambient light outside of the electronic device;
    a camera that is used to measure physiological attributes;
    gaze detection circuitry that determines a gaze position;
    a display that generates virtual reality content; and
    control circuitry configured to:
        receive an ambient light reading from the ambient light sensor;
        gather user input; and
        adjust a brightness of the virtual reality content on the display based on the ambient light reading, the physiological attributes, and the user input, wherein the control circuitry is configured to apply a first tone mapping to the virtual reality content that aligns with the gaze position and a second tone mapping to the virtuality reality content that is not aligned with the gaze position, and wherein the second tone mapping is different from the first tone mapping.

2. The electronic device defined in claim 1 wherein the control circuitry is configured to adjust the brightness of the virtual reality content based on the gaze position.

3. The electronic device defined in claim 2 wherein the control circuitry is configured to determine an average pixel brightness at a location on the display that aligns with the gaze position.

4. The electronic device defined in claim 3 wherein the control circuitry is configured to adjust the brightness of the virtual reality content based on the average pixel brightness at the location.

5. The electronic device defined in claim 1 wherein the physiological attributes comprise at least one of blink rate, pupil size, and eye openness.

6. The electronic device defined in claim 1 wherein the control circuitry is configured to estimate a brightness adaptation state based on the ambient light reading and to adjust the brightness of the virtual reality content based on the estimated brightness adaptation state.

7. The electronic device defined in claim 1 wherein the control circuitry is configured to select a tone mapping curve for the virtual reality content based on the ambient light reading and the physiological attributes.

8. An electronic device configured to be worn, comprising:
    an ambient light sensor that measures ambient light outside of the electronic device;
    a camera that is used to measure physiological attributes;
    a display that generates virtual reality content; and
    control circuitry configured to:
        receive an ambient light reading from the ambient light sensor; and
        adjust a brightness of the virtual reality content on the display based on the ambient light reading and the physiological attributes, wherein the control circuitry is configured to adjust the brightness of the virtual reality content from a first brightness level to a second brightness level, wherein the first brightness level is less than the second brightness level, and wherein the first brightness level is used when the display displays a video and the second brightness level is used when the display displays a menu screen.

9. An electronic device configured to be worn, comprising:
an ambient light sensor that measures ambient light outside of the electronic device;
an input-output component that gathers eye information;
a display that generates virtual reality content; and
control circuitry configured to:
estimate a brightness adaptation state based on the ambient light and the eye information; and
adjust a brightness of the virtual reality content on the display based on the brightness adaptation state, wherein the control circuitry is configured to adjust the brightness of the display from a first brightness level to a second brightness level, wherein the first brightness level is greater than the second brightness level, and wherein the first brightness level is used when the display is turned on and the second brightness level is used a period of time after the display is turned on.

10. The electronic device defined in claim 9 wherein the control circuitry is configured to adjust the brightness by optimizing the brightness for the brightness adaptation state.

11. The electronic device defined in claim 9 wherein the control circuitry is configured to adjust the brightness of the display from a third brightness level to a fourth brightness level, wherein the third brightness level is less than the fourth brightness level, and wherein the third brightness level is used when the display displays a video and the fourth brightness level is used when the display displays a menu screen.

12. The electronic device defined in claim 9 wherein the input-output component comprises a camera that is used to measure a gaze position.

13. The electronic device defined in claim 12 wherein the control circuitry is configured to determine an average pixel brightness at a location on the display that aligns with the gaze position.

14. The electronic device defined in claim 13 wherein the control circuitry is configured to estimate the brightness adaptation state based on the average pixel brightness at the location.

15. The electronic device defined in claim 9 wherein the input-output component comprises a camera that measures at least one of blink rate, pupil size, and eye openness.

16. A method for operating an electronic device having a display that displays virtual reality content, comprising:
with an ambient light sensor, measuring ambient light outside of the electronic device;
with a camera, gathering eye information;
with control circuitry, determining a brightness adaptation state based on the eye information; and
adjusting a brightness of virtual reality content based on the brightness adaptation state and based on a type of virtual reality content being displayed, wherein the control circuitry reduces the brightness before an anticipated brightness increase to increase a perceived dynamic range of the display.

17. The method defined in claim 16 wherein adjusting the brightness of the virtual reality content comprises optimizing the brightness of the virtual reality content for the brightness adaptation state.

18. The method defined in claim 16 wherein adjusting the brightness of the virtual reality content comprises decreasing the brightness of the virtual reality content to shift the brightness adaptation state from a first brightness adaptation level to a second brightness adaptation level.

19. The method defined in claim 16 wherein gathering eye information comprises tracking at least one of: gaze position, blink rate, pupil size, and eye openness.

* * * * *